2,807,178

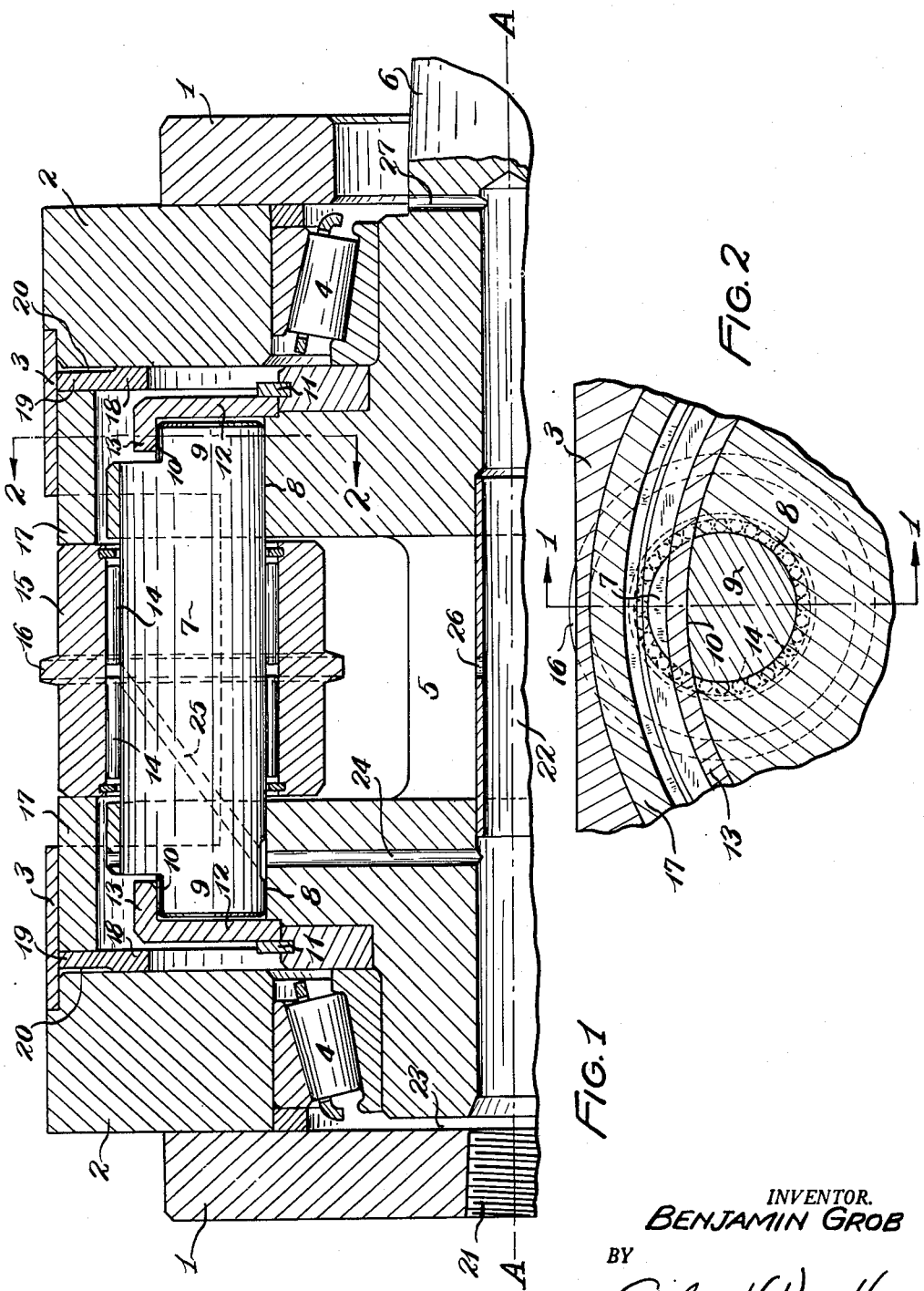

ROLLER TOOL MOUNTING MEANS

Benjamin Grob, Grafton, Wis., assignor to Grob, Inc., Grafton, Wis., a corporation of Wisconsin Application May 9, 1956, Serial No. 583,694

4 Claims. (Cl. 80—16)

This invention relates to machines for forming alternate grooves and teeth in cylindrical blanks, such as in the production of gears or splines, and for the purpose employing a plurality of planet roller tools driven to repeatedly engage the blank in succession for its incrementally progressive deformation.

The general principles of operation contemplated are set forth in Patent No. 2,715,846, issued August 23, 1955, to Grob et al., and a complete operative machine for the purpose is disclosed in my copending application Serial No. 499,571, filed April 6, 1955.

This invention pertains particularly to the mounting structure by which a set of planet roller tools is caused to engage the work blank and, generally, the invention constitutes improvements in this respect, over the disclosure of my said copending application.

More particularly, an object of the invention is to provide improved means for mounting of the roller tools on the head by which they are driven, to locate them substantially positively axially, yet with provision against their axial overloading, while at the same time frictionally imparting components of motion thereto of hypocycloidal character, so that their action as they engage the work blank is of rolling character.

The invention includes, as another object, improved means for mounting upon the head, of the shafts which carry the roller tools.

Further objects and advantages will be apparent from the following description taken in connection with the accompanying drawings, wherein:

Fig. 1 is a typical longitudinal section, as in the plane which includes the axis of rotation of the head and also the axis of one of a plurality of roller tools thereof; and Fig. 2 is a transverse detail section, as in the plane of line 2—2 of Fig. 1, the line 1—1 of Fig. 2 also indicating the plane of Fig. 1.

With reference now to the drawings, the machine contemplated includes a stationary housing here appearing as made up of principal parts 1, 2 and 3, rigidly secured together by means not here shown but well known in the art.

Mounted in the housing for rotation about a central axis A—A, as by means of roller bearings 4 is a head generally indicated at 5 having extension 6 for its drive.

A set of shafts are mounted on the head in spaced parallel relation about the axis A. One of said shafts only, 7, together with its mounting arrangement, appears in the drawings but it will be understood that such showing is typical and that in practice two or more such shafts are provided, spaced uniformly about the axis A and similarly mounted, and together comprising a set thereof.

Each shaft 7 has a pair of axially spaced cylindrical bearings in the head 5, as at 8, and has an end portion 9 extending beyond each bearing 8 to there provide a shoulder having a surface 10 extending crosswise of the shaft 7 and facing from the axis A—A.

At each end of the shaft set, a securing ring 12 is mounted on the head 5. Each securing ring has a radially inner portion overlying the ends of the shafts 7 of the set and fixed as by a lock ring 11. Each securing ring has a radially outer flange portion 13 extending about and bearing on the shoulder surfaces 10 of its set of shaft ends. Preferably the shoulder surfaces 10 of the shaft 7 are curved to fit the flanges 13 of their securing rings, and the latter are press fitted over and about the shoulder surfaces so as to positively and rigidly secure the shafts 7 against centrifugal forces.

Rotatably mounted on each shaft 7, between its bearings 8, is a planet roller tool 15 having an annular metal-working member such as rib 16 for forming engagement with the work.

Each roller tool has flat end faces as indicated, and means are provided for cooperation therewith to frictionally impart hypocycloidal motion components coincident with rotation of the head 5 about its axis A, so that initial engagement of the tool with the work will be of predetermined rolling character, with minimum acceleration or deceleration of the tool about its own axis as it meets the work while driven about the central axis A—A.

For this purpose, I provide, at each end of the set of roller tools, a friction ring 17 mounted in the stationary housing for possible endwise motion but without motion about the axis A—A.

Each friction ring 17 has a flat face for cooperative bearing against the corresponding end faces of the set of roller tools.

At the opposite end face of each friction ring 17 I provide a backing ring 18 therefor. Each backing ring includes a radially inner portion having endwise bearing against the near housing member 2, and a radially outer portion 19 having endwise bearing against its friction ring and cut away as at 20, so as to be there without endwise bearing against the housing.

By the means just described, friction between the adjacent end faces of the roller tools and their friction ring 17, the tools will have hypocycloidal motion coincident with their drive about axis A—A. Also, they will be very firmly located endwise on their shafts 7. However, upon endwise overloading of the roller tools in either direction, the suitable backing ring may flex slightly to prevent damage to the tool either at an end face or at its work engaging member 16.

As is known in the art, means are provided for lubrication of the parts shown, such as by way of an inlet 21 in the housing, the central passage 22 in the head and suitable leads therefrom, as by way of the space 23 to the lefthand bearing 4, and leads 24 and 25 to the needle bearing 14, 26 to the roller tool, and 27 to the righthand bearing 4.

By such means a film of lubricant is provided between cooperative pairs of bearing surfaces.

Particularly such film is provided between the cooperating end surfaces of the rollers 15 and their friction rings 17, so that, precisely, actual metal to metal contact is avoided. It is largely to avoid such actual contact at these locations, that the described emergency relief, available by slight flexure of the backing rings 18, is provided.

I claim:

1. In a groove rolling machine of the class described and having a stationary housing, a head mounted therein for drive about a central axis, a set of shafts mounted on said head in spaced parallel relation about said axis, and a set of roller tools each rotatably mounted on one of said shafts, said tools having flat end faces disposed to define a pair of planes spaced along said axis: non-rotating means on said housing to frictionally impart hypocycloidal motion components to said tools on rotation of said head, said means comprising, at each end of said set of tools to locate said tools endwise on their shafts, and to provide them endwise overload relief, a friction ring having a flat end face cooperative with an end face of each of said tools about said axis beyond said shafts, and a backing ring for said friction ring, at the other end face thereof, said backing ring including a radially inner portion having endwise bearing against said housing and a radially outer portion having endwise bearing against said friction ring without endwise bearing against said housing.

2. In a groove rolling machine of the class described and having a stationary housing, a head mounted therein for drive about a central axis, a set of shafts disposed in spaced parallel relation about said axis, each of said shafts having a pair of axially spaced cylindrical bearings in said head, and a roller tool rotatably mounted on each shaft between its said bearings: means for securing said shafts against rotation in their said bearings and against centrifugal forces about said axis, said means comprising, at each end of each shaft, a portion extending beyond its said bearing to there provide a shoulder having a surface extending crosswise of the shaft and facing from said axis, and, at each end of said shaft set, a securing ring having a radially inner portion overlying the ends of the shafts of said set, and a securing ring having a radially inner portion fixed in said head, and a radially outer flange portion extending about and bearing on the said shoulder surfaces of said set of shafts.

3. Apparatus as set forth in claim 2 wherein said flange portion of said securing ring is press fitted about said shoulder surfaces of said shafts.

4. Apparatus as set forth in claim 2 wherein said shoulder surfaces of said shafts are curved to fit within said flange portion of said securing ring.

No references cited.